United States Patent
Swierczewski (10) Patent No.: US 8,297,698 B2
(45) Date of Patent: Oct. 30, 2012

(54) MECHATRONIC VEHICLE SAFETY SEAT

(76) Inventor: Richard Swierczewski, Toms River, NJ (US)

( * ) Notice: Subject to any disclaimer, the term of this patent is extended or adjusted under 35 U.S.C. 154(b) by 360 days.

(21) Appl. No.: 12/661,503

(22) Filed: Mar. 17, 2010

(65) Prior Publication Data

US 2011/0227377 A1 Sep. 22, 2011

(51) Int. Cl.
*B60N 2/42* (2006.01)
*B60R 21/00* (2006.01)

(52) U.S. Cl. .............................. 297/216.15; 297/216.1

(58) Field of Classification Search ............... 297/216.1, 297/216.15, 216.16, 216.19, 216.2
See application file for complete search history.

(56) References Cited

U.S. PATENT DOCUMENTS

| | | | |
|---|---|---|---|
| 2,102,979 A | 12/1937 | Smith | |
| 2,227,717 A | 1/1941 | Jones | |
| 2,335,340 A | 11/1943 | Koppelman | |
| 2,433,950 A | 1/1948 | Henderson | |
| 2,660,222 A | 11/1953 | Woodsworth | |
| 2,725,921 A * | 12/1955 | Markin | 297/216.15 |
| 2,735,476 A | 2/1956 | Fieber | |
| 2,736,566 A | 2/1956 | Hartl | |
| 3,081,059 A | 3/1963 | Hastings et al. | |
| 3,463,543 A * | 8/1969 | Zellar | 297/216.2 |
| 3,471,197 A | 10/1969 | Ely | |
| 3,578,376 A | 5/1971 | Hasegawa et al. | |
| 3,953,068 A | 4/1976 | Porsche et al. | |
| 4,154,472 A | 5/1979 | Bryll | |
| 4,275,914 A | 6/1981 | Holweg et al. | |
| 4,349,167 A | 9/1982 | Reilly | |
| 5,022,707 A * | 6/1991 | Beauvais et al. | 297/216.2 |
| 5,125,598 A | 6/1992 | Fox | |
| 5,292,179 A | 3/1994 | Forget | |
| 5,295,729 A | 3/1994 | Viano | |
| 5,344,204 A | 9/1994 | Liu | |
| 5,460,427 A | 10/1995 | Serber | |
| 5,556,160 A | 9/1996 | Mikami | |
| 5,567,006 A | 10/1996 | McCarthy | |
| 5,605,372 A | 2/1997 | Al-Abdullateef | |
| 5,636,424 A | 6/1997 | Singer | |
| RE35,572 E | 7/1997 | Lloyd et al. | |
| 5,743,591 A | 4/1998 | Tame | |
| 5,967,604 A | 10/1999 | Yoshida et al. | |
| 6,022,074 A | 2/2000 | Swedenklef | |
| 6,244,656 B1 | 6/2001 | Mueller | |
| 6,257,663 B1 | 7/2001 | Swierczewski | |
| 6,302,481 B1 * | 10/2001 | Swann et al. | 297/216.18 |
| 6,416,127 B1 * | 7/2002 | Galbreath et al. | 297/216.13 |
| 6,435,591 B1 | 8/2002 | Nilsson | |

(Continued)

FOREIGN PATENT DOCUMENTS

| | | |
|---|---|---|
| DE | 2112443 | 9/1971 |
| DE | 2060951 | 6/1972 |
| GB | 2087226 A | 5/1982 |
| JP | 2005-205939 A | 8/2005 |

*Primary Examiner* — David Dunn
*Assistant Examiner* — Philip Gabler
(74) *Attorney, Agent, or Firm* — Thomas Swenson (57) ABSTRACT

The mechatronic vehicle safety seat described transforms the geometry of the bottom frame and backrest frame associated with a head restraint when a collision is imminent. On a signal from a pre-crash detection device, or a manual or verbal indication, an energized solenoid instantly releases the forces of torsion springs and triggers the seat bottom and backrest for concurrent movement in sufficient time to mitigate excessive accelerations, loads and moments of forces acting upon seated occupants in response to impact modes. The distorted geometry of the bottom frame and backrest with head restraint enhances the safety performance of the seat belt and reduces the aggressiveness of airbags.

20 Claims, 8 Drawing Sheets

U.S. PATENT DOCUMENTS

| | | |
|---|---|---|
| 6,742,838 B1 | 6/2004 | Swierczewski |
| 6,851,747 B2 * | 2/2005 | Swierczewski .......... 297/216.19 |
| 7,140,682 B2 | 11/2006 | Jaeger et al. |
| 7,604,293 B2 * | 10/2009 | Matsuhashi ................ 297/216.2 |
| 7,918,501 B1 * | 4/2011 | Hanson et al. ............. 297/216.2 |
| 2007/0262604 A1 | 11/2007 | Takei et al. |
| 2010/0066116 A1 | 3/2010 | Coenen |
| 2010/0283302 A1 | 11/2010 | Fukuda |
| 2011/0210586 A1 | 9/2011 | Masutani |

* cited by examiner

MECHATRONIC VEHICLE SAFETY SEAT

FIELD OF THE INVENTION

The present invention relates to the field of vehicle seats, and more particularly to driver and front passenger seats configured for minimizing collision injuries to vehicle occupants.

BACKGROUND OF THE INVENTION

A number of practices and apparatuses have been devised to provide a vehicle seat for absorbing different forces, shocks, and vibrations commonly encountered in vehicular collisions. Several related patents are briefly described below.

U.S. Pat. No. Re. 35,572 issued on Jul. 29, 1997 to Lloyd et al. discloses a seat assembly for a motor vehicle that includes an air suspension system for isolating the occupant of the seat from shock, vibration and inertial forces directed along both vertical and horizontal axes. A base plate is mounted to the floor of the vehicle and supports first and second pairs of sleeve bearings on opposed sides of a box-like housing. The housing is attached to a pair of guide rods, which cooperate with the sleeve bearings to provide fore and aft movement of the housing. Springs operating in cooperation with a first horizontally disposed air bag serve to dampen out inertial forces to the vehicle seat. The seat itself is supported on a vertically oriented air spring and a plurality of hydraulic vibration dampeners that tend to cushion vertically directed forces acting upon the seat and its occupant.

U.S. Pat. No. 2,227,717 issued on Jan. 7, 1941 to Jones relates to structure for mounting a chair to the body of an airplane. The structure is designed to move the chair forward and upward in the event of collision, whereby the person occupying the chair will be tossed in a curved path and thus relieved substantially from shock caused by the collision forces.

U.S. Pat. No. 3,081,059 issued on Mar. 12, 1963 to Hastings et al. is drawn to a seat base having an inverted cone secured to the underside of the seat. The front legs of the seat are pivotally mounted to the floor of the vehicle. A single rear leg telescopes against the action of a spring.

U.S. Pat. No. 4,275,914 issued on Jun. 30, 1981 to Holweg et al., discloses an arresting device in a longitudinally adjustable guide rail assembly for motor vehicle seats. The device includes a shaft rotatably supported in a stationary bearing plate and driven by a stationary electromotor. The driving pinion of the electromotor is in mesh with an intermediate gear, which is supported for joint rotation on the shaft. A coupling disk is supported for joint rotation on the shaft and for axial displacement between the bearing plate and the face of an intermediate gear.

U.S. Pat. No. 5,292,179 issued on Mar. 8, 1994 to Forget, discloses a fixed plate supporting a vehicle seat that is secured to longitudinal adjusting slides. The fixed plate supports a rotary intermediate plate via a first ball bearing and a cover rigidly connected to the fixed plate and supported at the rotary intermediate plate via a second ball bearing.

U.S. Pat. No. 5,344,204 issued on Sep. 6, 1994 to Liu, discloses a safe driver seat unit that includes a seat supported on two rails by four ball bearings mounted in the seat legs, and an arrangement wherein an electromagnetic controller locks the seat in normal position. In a collision, sensors will turn on power to unlock the seat so that springs may move the seat backwardly.

U.S. Pat. No. 5,605,372 issued on Feb. 25, 1997 to Al-Abdullateef, discloses an automotive safety seat that reduces g-loads imparted to an occupant during a collision by absorbing some of the energy of impact. Kinetic energy is converted to potential energy with the elevation of the seat and its occupant and the compression of springs.

U.S. Pat. No. 5,743,591 issued on Apr. 28, 1998 to Tame, discloses a vehicle seat, which includes a seat cushion assembly and a hydraulic actuator. A first mounting assembly is constructed and arranged to mount the seat cushion assembly on a vehicle floor, and a second mounting assembly is provided which is constructed and arranged to mount a seat back assembly on the seat cushion assembly.

U.S. Pat. No. 6,851,747 issued on Feb. 8, 2005 to the present inventor teaches a collapsible vehicle safety seat supported on a pivotable linkage. On vehicle impact or a signal indicating imminent impact, the linkage releases to drop the vehicle seat and the occupant to an angled position, reducing movement due to high deceleration forces.

German Patent No. 2,112,443 published Sep. 23, 1971, discloses a vehicle passenger safety system which has seat belt anchorages and/or the seat rear anchorage points attached through energy absorbing components so that each passenger describes a predetermined path within the compartment with an increasing braking force until suitable padding brings the passenger to a safe stop.

German Patent No. 2,060,951 published Jun. 22, 1972, discloses a car seat that is mounted on a spring-loaded support to absorb impact forces. The support is braced by either mechanical springs or hydraulic shock absorbers, and converts impact forces into a smooth recoil to protect the occupants in the event of a collision.

Great Britain U.S. Pat. No. 2,087,226A published May 26, 1982, discloses a shock absorbing seat that is formed by two connected portions. The shorter rear portion is a flat metal sheet bent upwardly at the back and riveted to the rear cross-member of a tubular support frame. The front portion includes a metal sheet, which is "waisted" in plan view and curved upwardly from the rear in side elevation to a smoothly curved peak from which it is bent downwardly as a flat vertical panel. The panel is riveted along its lower edge to the front cross-member of the support frame.

None of the above noted inventions and patents discloses a mechatronic vehicle safety seat, taken either singly or in combination, as described and claimed below.

SUMMARY OF THE INVENTION

The mechatronic vehicle safety seat, called hereafter a vehicle safety seat, comprises an active bottom frame and backrest associated with a head restraint configured for concurrent movement when a collision is imminent. The vehicle safety seat adopts the latest pre-crash sensing technology (e.g. a radar sensor in the millimeter wave length range) for transmitting a command signal via an electronic control unit to a rotary solenoid. The energized rotary solenoid instantly releases forces of a first pair of torsion springs triggering a pair of movable shafts for releasing forces of a second pair of torsion springs to transform a quasi-hexahedron cuboid configuration to a quasi-pentahedron cuboid seat bottom frame and its supporting legs. The front and rear supported legs have upper and lower ends. The upper ends of the front legs are pivotally mounted to a front section of the seat bottom frame. The lower ends of the front legs are affixed in a conventional manner to the upper member of the seat height adjustment mechanism. The upper ends of the rear legs are pivotally connected to the rear section of the seat bottom frame. The lower ends of the rear legs are mounted pivotally to a slider positioned to interact with the upper member of the seat height adjustment mechanism, acting as sliding rails. When the actuator is energized, a pair of second torsion springs are released to move the seat rear legs from a vertical to a horizontal position and the seat bottom frame from the normal substantially horizontal orientation to a deployed angular orientation.

A rigid bar at the rear of the seat support frame controls a set of third torsion springs interacting with the backrest frame and upper unit seat back recliner. The vertically positioned linkages connect the legs of the third torsion springs with the legs of a hinge for predetermined distortion of the backrest frame and the head restraint from a first to a second position. The top of the backrest frame has an open member positioned on the left side of the head restraints for uniform interaction between the backrest frame and the seat belt before, during and after a collision. The rear sections of the seat bottom frame and the lower edge of the backrest frame have a perimeter hidden inside of the seat cushion during normal driving conditions and exposed when the vehicle safety seat bottom frame and backrest frame are transformed to the second position.

The invention described below provides improved elements and arrangements thereof in an apparatus for the purposes described which are dependable, flexible in movement, and fully effective in accomplishing their intended purposes.

OBJECTS OF THE INVENTION

It is a principal object of the invention to provide a vehicle safety seat that utilizes the latest pre-crash detection technology to take corrective action to reconfigure the bottom frame geometry in sufficient time to mitigate excessive accelerations, loads and moments of force acting upon seated occupants in response to the impact.

It is another principal object of the invention to provide a vehicle safety seat having an active backrest frame associated with a head restraint to interact with a seat recliner for instantly translating from a first configuration during normal car driving conditions to a second configuration when a collision is imminent.

These and other objects of the invention will become readily apparent upon further review of the following specification, drawings and claims.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
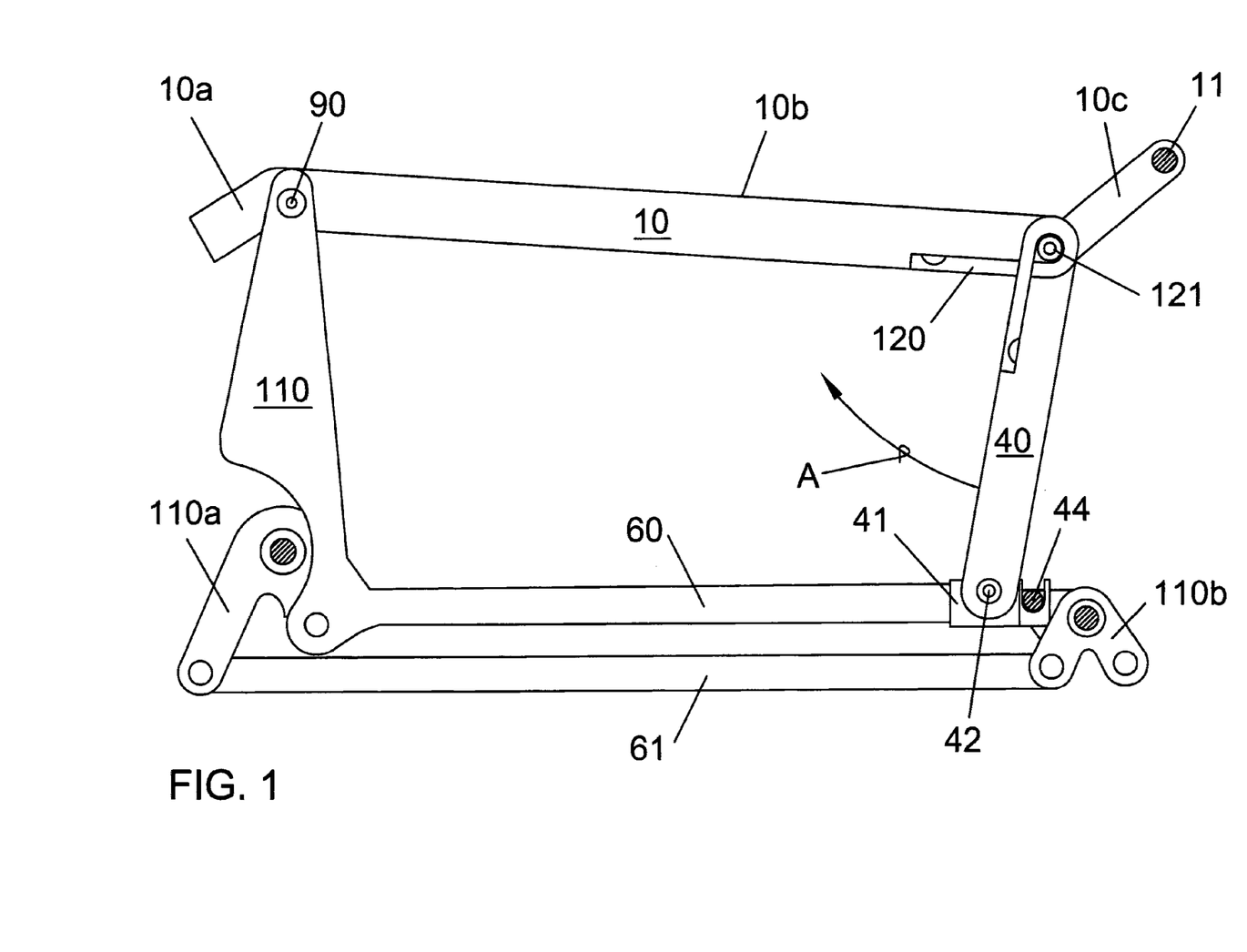
FIG. 1 is a side elevation view of the seat bottom frame supported having front pivoting legs and rear sliding legs in its normal configuration, according to the preferred embodiment of the present invention.

FIG. 1 illustrates the general relation of various components of the vehicle safety seat in rest position during normal driving conditions according to the present invention. A seat bottom frame 10 is supported by a pair of front legs 110 and a pair of rear legs 40 (only one front leg and one rear leg seen). Seat bottom frame 10 is formed with three sections: frontal 10a, middle 10b and rear 10c to maximize safety, comfort and ergonomics during normal driving conditions as well as when seat bottom 10 is transformed to a geometric supportive configuration when a collision is imminent. The essential function of frontal section 10a of seat bottom frame 10 is to protect occupant's legs, being one of the most frequently injured body parts due to a vehicle collision. The basic function of middle section 10b of seat bottom frame 10 is immobilizing occupants pelvis to alleviate kinematics of critical regions of an occupant's body. Rear section 10c of seat bottom frame 10 has a rigid bar 11 positioned horizontally and oriented perpendicular to the vehicle centerline (not shown). Rigid bar 11 is solely responsible for retaining a third torsion spring 32 (see FIG. 3). The upper end of front leg 110 is pivotally connected to seat bottom frame frontal section 10a by pivot 90. The lower end of front leg 110 is affixed to the front member of the seat height adjustment mechanism 110a most likely by means of a rivet. The upper end of rear leg 40 is pivotally attached to seat bottom frame rear section 10c by pivot 121. The lower end of rear leg 40 is pivotally attached to slider 41 by pivot 42. Slider 41 is held during normal driving by movable shaft 44 to serve as a latch. Biasing means, e.g. a second torsion spring 120, is mounted between a rear section of seat bottom frame 10 and the upper end of rear leg 40. Alternate biasing means, such as a tension/extension spring, is considered to be within the scope of the invention. Second torsion spring 120 is mounted to seat bottom 10 under tension in a manner to cause rear leg 40, when slider 41 is released, to pivot in the direction indicated by arrow A, as described below. The upper member 60 of the seat height adjustment mechanism performs additionally as a sliding rail that uses a brass sleeve as an antifriction bearing surface. Sliding rail 60 is horizontally connected to front member 110a and rear member 110b of the height adjustment mechanism. The lower member 61 of the seat height adjustment mechanism is connected to a seat longitudinal adjustment mechanism (not shown).

Figure 2:
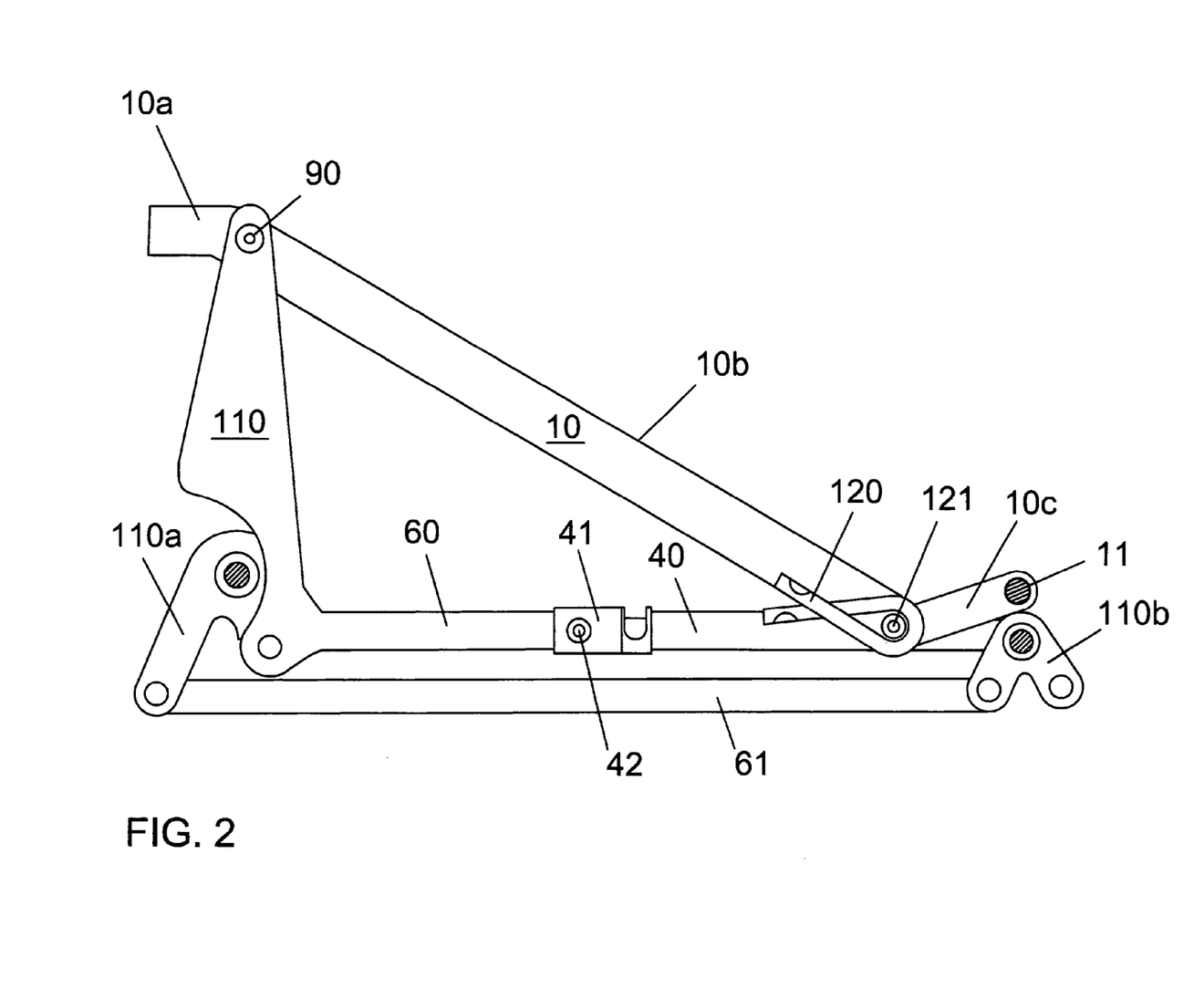
FIG. 2 is a side elevation view of the seat bottom of FIG. 1 supported in angular orientation by front pivoting legs and rear sliding legs in the deployed configuration.

FIG. 2 illustrates the general configuration of the vehicle safety seat of FIG. 1 in its deployed position when a collision is imminent, according to the present invention. The energized solenoid, as described below in relation to FIG. 6, has triggered the first torsion springs 48 (see FIG. 5) for retraction of a latch 44 from slider 41. After slider 41 has been released, a second torsion spring 120 pushes slider 41 over sliding rails 60 in association with rear legs 40. The configuration of seat bottom frame 10 is transformed from a substantially horizontal orientation to a second angled position in sufficient time prior to an impact to mitigate accelerations, loads and moments of forces to a seated occupant.

Figure 3:
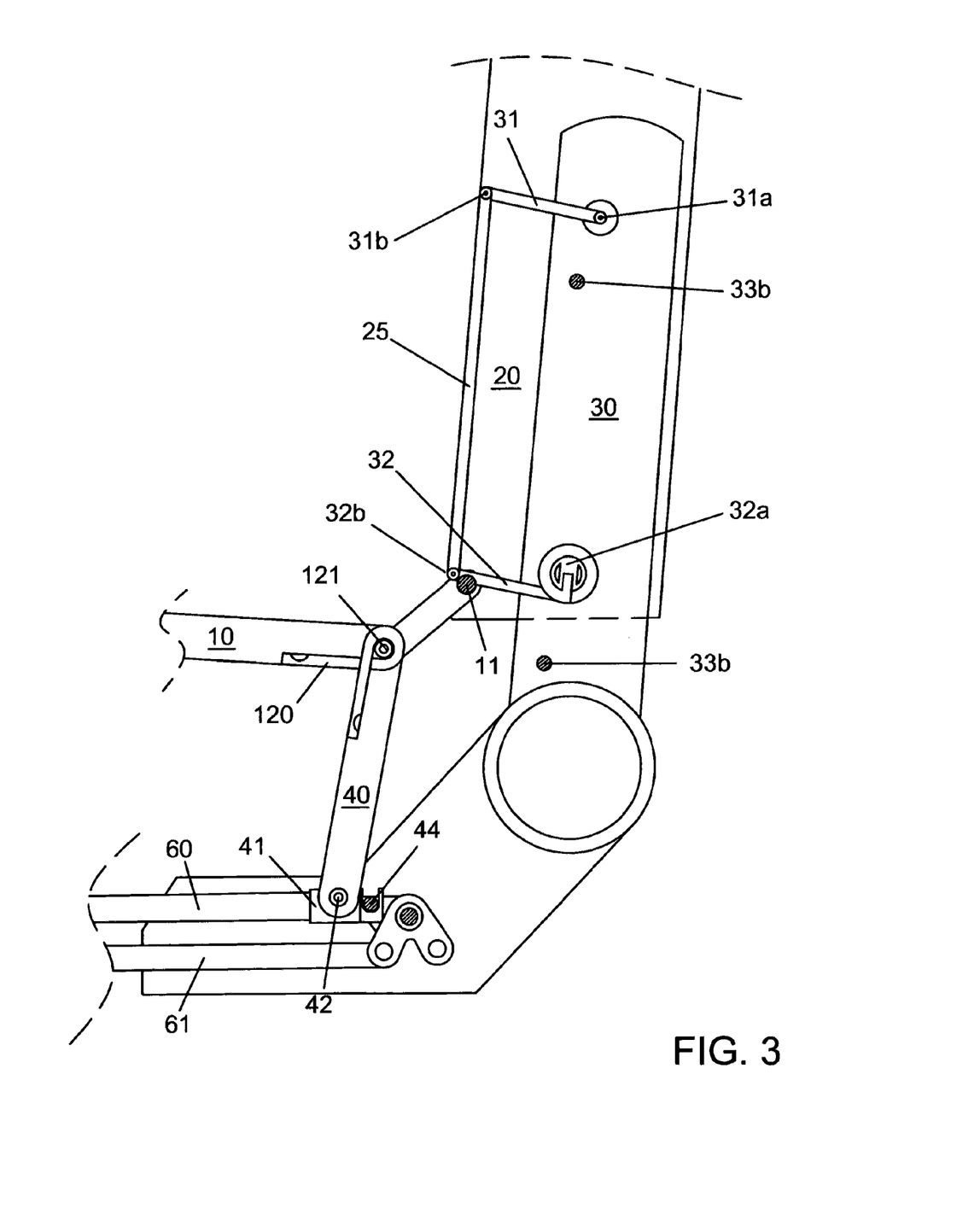
FIG. 3 is a side partial sectional view of the backrest frame with various interacting components in the normal configuration according to the preferred embodiment of the present invention.

FIG. 3 illustrates the general configuration of the vehicle safety seat backrest portion in rest position during normal driving conditions, according to the present invention. The backrest frame 20 has a head restraint (not shown) mounted thereto, and a seat recliner 30, a third torsion spring 32 held in tension by rigid bar 11. A hinge 31 supports a rigid linkage 25 that is controlled by second torsion spring 32. Latch 44 restrains slider 41 against the force of second torsion spring 120. Rigid bar 11 holds the leg of second torsion spring 32 in tension condition. The normal location of backrest frame 20 is controlled by rigid linkage 25, shown in the normal driving position. Rigid linkage 25 connects pivot 32b of second torsion spring 32 with pivot end 31b of hinge 31. Pivot ends 31b and 32b are each pivotally assembled to backrest frame 20. Third torsion spring 32 and hinge 31 are attached to seat recliner 30 by at least two corresponding points, upper point 31a and lower point 32a. A pair of external stoppers 33b are mounted to seat recliner 30 for cushioning deployment of backrest frame 20 to the position seen in FIG. 4. Rigid linkage 25 is contained within a housing to isolate the movable assembly from a cushion of the backrest.

Figure 4:
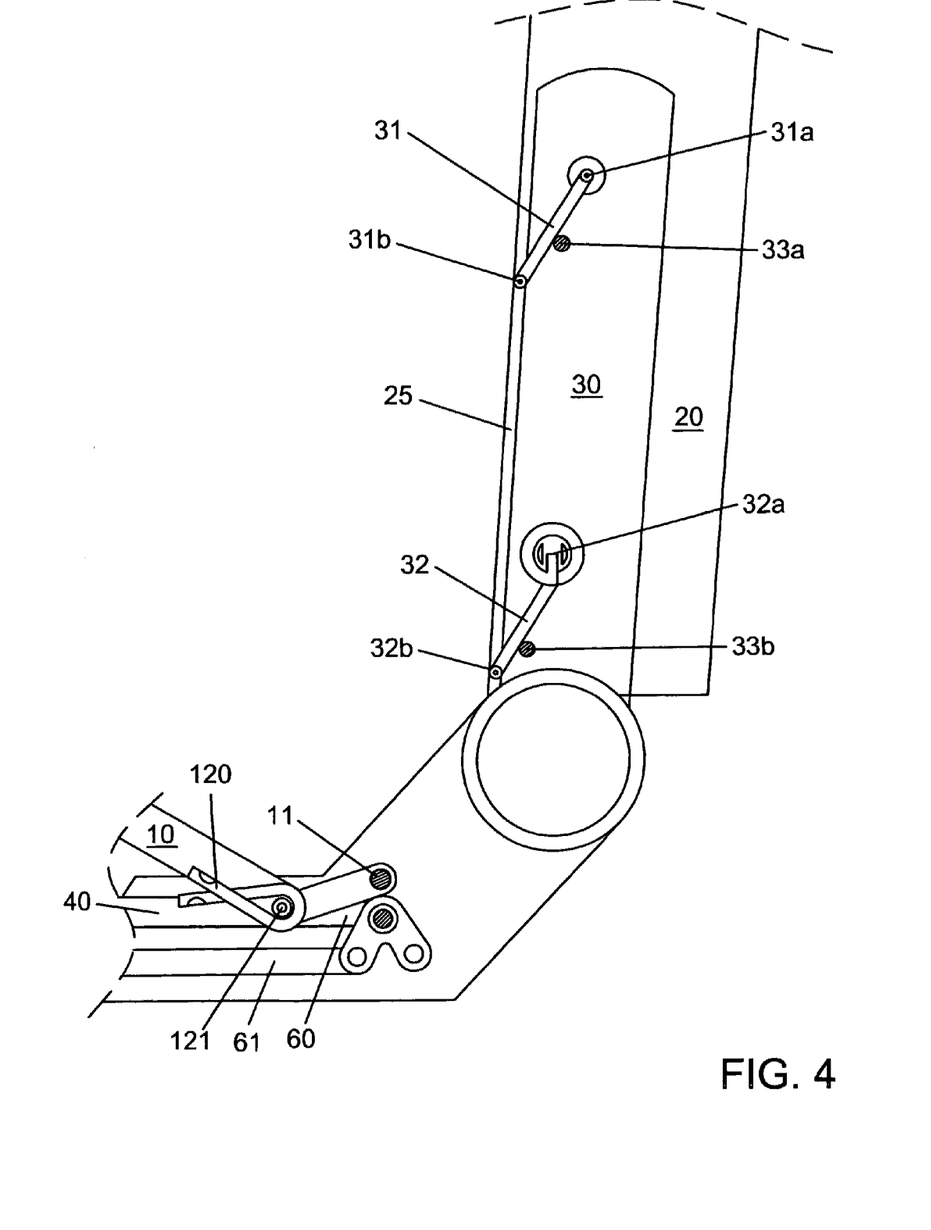
FIG. 4 is a side partial sectional view of a backrest frame of FIG. 3 with various interacting components in the deployed configuration.

FIG. 4 illustrates the vehicle safety seat according to the present invention as shown in FIG. 3 in deployed position when a collision is imminent. Backrest frame 20, third torsion springs 32, rigid bar 11 fixedly connected to seat bottom frame 10, hinge 31 and linkage 25 are instantly deployed from first to second position by second torsion spring 120 when latch 44 (see FIG. 3) is retracted. The seat bottom frame 10 with rigid bar 11 are deployed to the orientation of FIG. 4, instantly releasing third torsion spring 32. The vertically positioned rigid linkage 25 is forced down, moving backrest frame 20 rearward, as driven through corresponding upper pivot 31b and lower pivot 32b. Third torsion spring 32 interacts with rigid linkage 25 for synchronizing backrest frame 20 relative to the stable position of seat recliner 30. Two external stoppers 33a and 33b limit and cushion backrest frame 20 during transition from the first to the second position. The new orientation of seat bottom frame 10 along with the deployed position of backrest frame 20 and the connected head restraint (not shown) creates an additional suspension system for occupants, maintaining their optimum posture to withstand collision impact forces. Seat recliner 30 remains in its initial position before, during and after geometric transformation of the seat.

Figure 5:
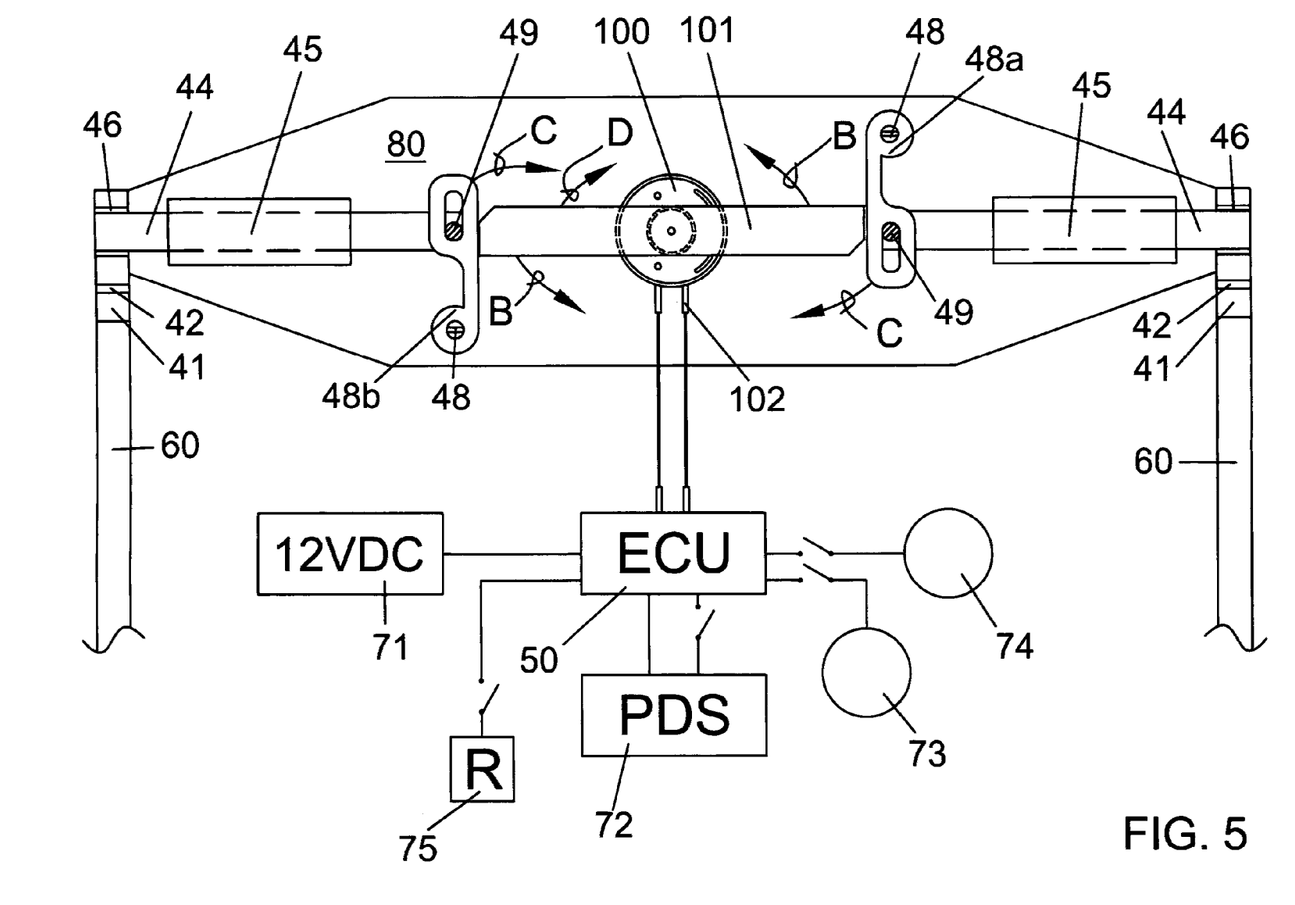
FIG. 5 is a top sectional view of the seat bottom of FIG. 1 including a rotary solenoid and schematic diagram showing the general relationship of the various components in the normal configuration.

FIG. 5 illustrates the general relationship of various components of the vehicle safety seat during normal driving conditions. A controllable release device, for example rotary solenoid 100, is assembled through mounting studs (not shown) to horizontally positioned plate 80. Plate 80 is connected to both sides of rear members of the seat height adjustment mechanism. Bar 101 interacts with a pair of first torsion springs 48, affixed to respective links 48a and 48b, to control the position of latch 44 through raised pins 49 pressed into links 48a and 48b. Both first torsion springs 48 are held in the initial position by bar 101, maintaining latch 44 in the extended position, thus latch slider 41 in the first position during normal driving conditions. First torsion springs 48 are mounted in tension to apply clockwise (right hand) force for rotating links 48a and 48b in the direction indicated by arrows C when released by bar 101 being rotated in the direction indicated by arrows B. The rotary motions of links 48a and 48b are converted to linear motion of latch 44. The latches 44 are enclosed in channels 45 that are affixed to plate 80. Channel 45 has a metal bearing sleeve to minimize surface friction between the interacting components. Slider rails 60 each have an antifriction surface 46 at the respective rear end for reducing the deployment time of latch 44. The leads 102 connect electronic control unit ECU 50, having a power supply 71, e.g. 12V DC. A pre-collision detection system PDS device 72 (most likely radar in the millimeter wave length range) is provided to initiate the actions of the mechatronic vehicle safety seat when a collision is imminent. The electrical circuit also contains a transducer such as microphone 74 or an ergonomically placed pushbutton 73 to generate a command signal to ECU 50 for instantly energizing rotary solenoid 100. The electrical circuit further has a manual return switch 75 to activate rotary solenoid 100 through a counter clockwise rotation and return links 48a and 48b to their initial zero degree position after a collision as indicated by arrow D.

Figure 6:
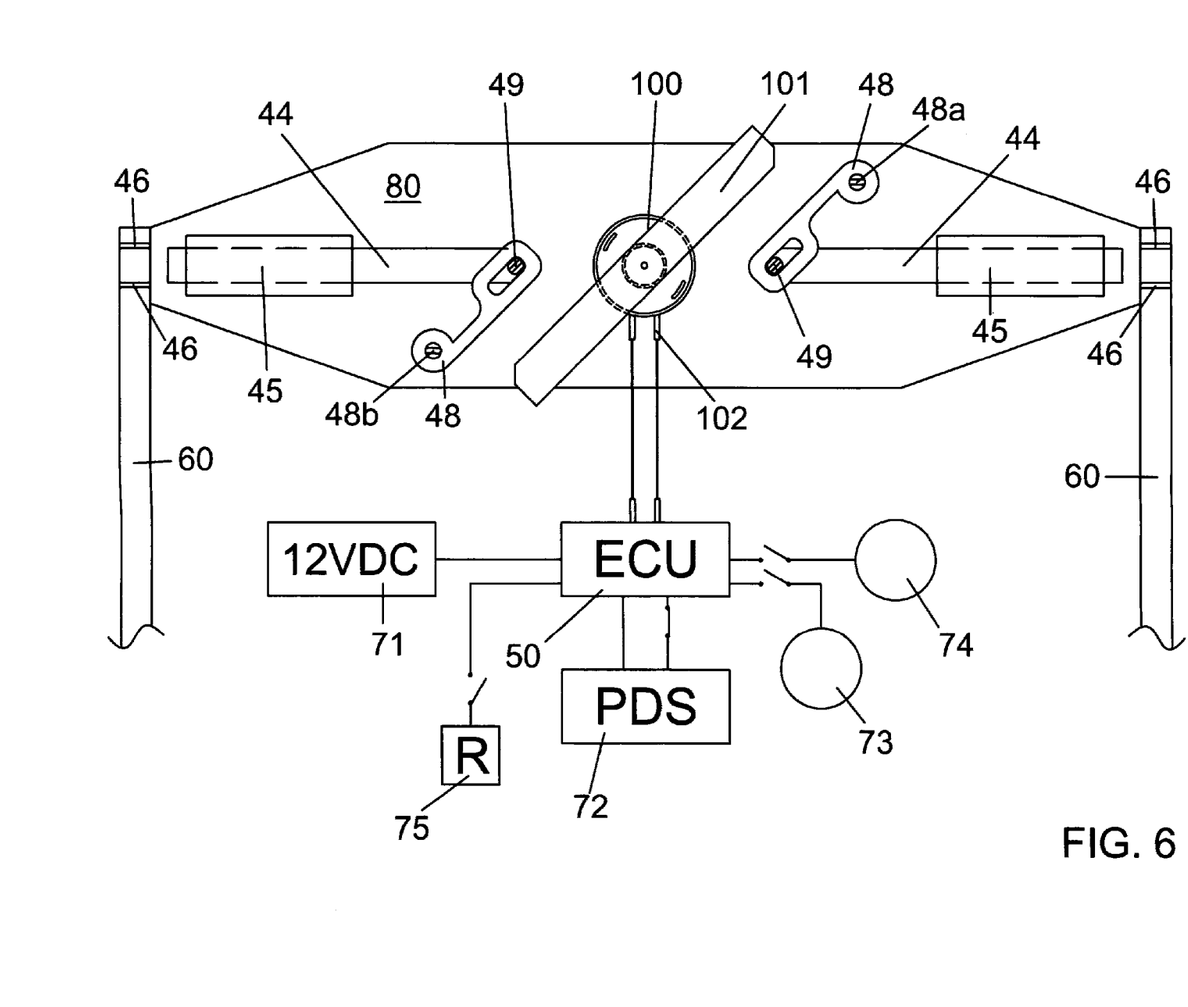
FIG. 6 is a top sectional view of FIG. 5 showing the general relationship of the various components in the deployed configuration.

FIG. 6 illustrates the general relationship of the various components of the vehicle safety seat of FIG. 5 in deployed condition when an impact is imminent. When the electronic control unit ECU 50 receives a signal from pre-crash detection system PDS 72, a command signal is transmitted for energizing rotary solenoid 100 as illustrated. The angle and direction of rotation of bar 101 are predeterminated to release the forces of first torsion springs 48. The first torsion springs 48 have links 48a and 48b controlled by a pin 49 raised from latch 44. Raised pin 49 is affixed to each latch 44 and engages each respective link 48a and 48b. The first torsion springs 48 convert the rotary motion of links 48a and 48b into linear motion to pull out latch 44 from sliders 41 (see FIG. 5) to immediately release the forces of second torsion springs 120 (see FIGS. 1-4). A sleeve 46 is provided in sliding rails 60 to enable latch 44 to minimize friction forces between two interacting parts. When latch 44 releases slider 41, the rear slidable legs 40 (see FIG. 2) change their initial vertical orientation to a horizontal orientation. Rotary solenoid 100 is allowed to rotate counter clockwise (left hand) to return to the de-energized position after a collision and reposition latch 44 into sliders 41 with rear legs 40 returned to their initial vertical orientation.

As contemplated in related patents of the present inventor, an air bag incorporated with a seat belt (not shown) is designed to deploy toward the vehicle dashboard instead of toward the occupant.

Figure 7:
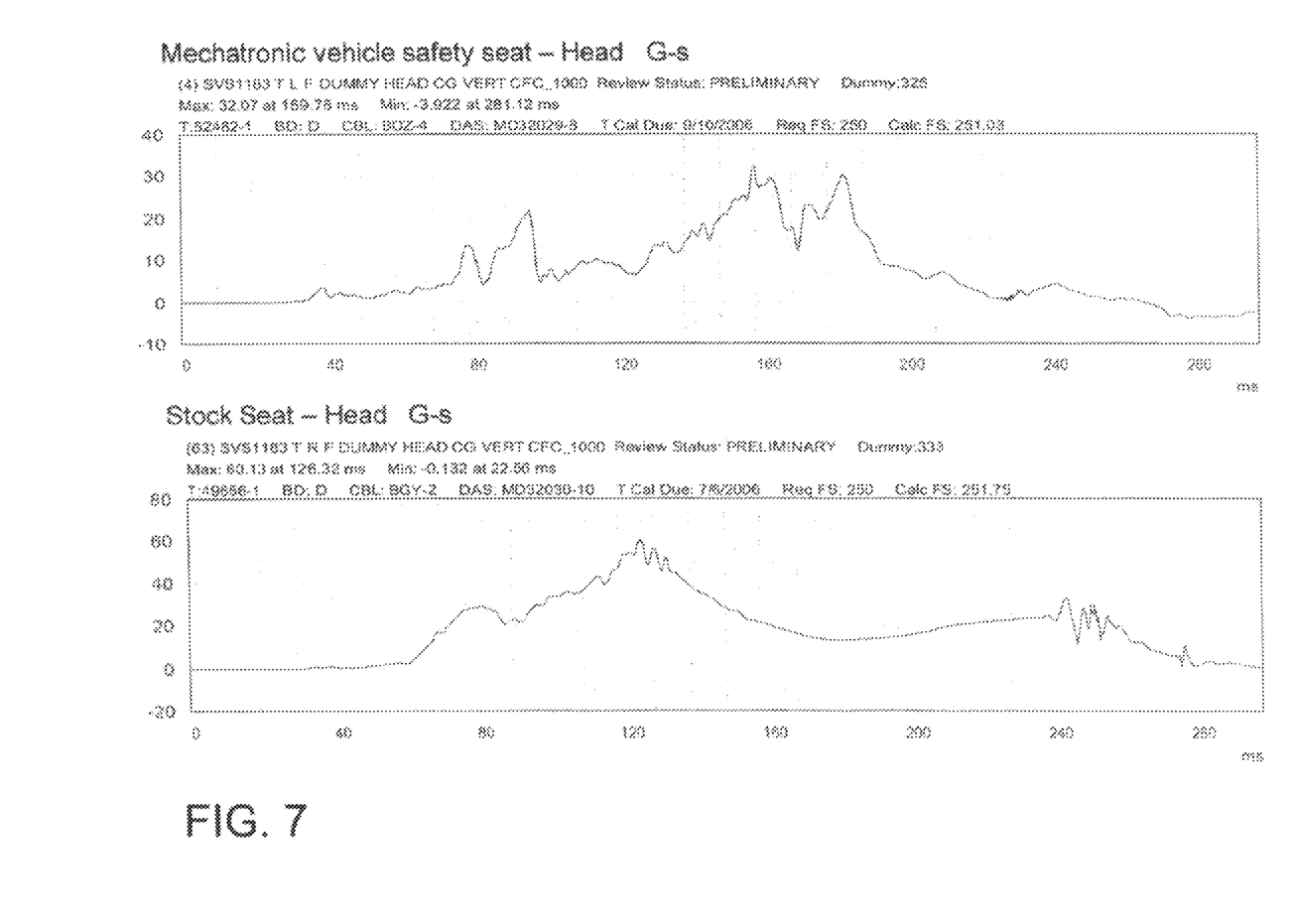
FIG. 7 shows two graphs comparing head acceleration of a dummy occupying a vehicle safety seat versus a dummy in a stock seat from frontal sled test.
Figure 8:
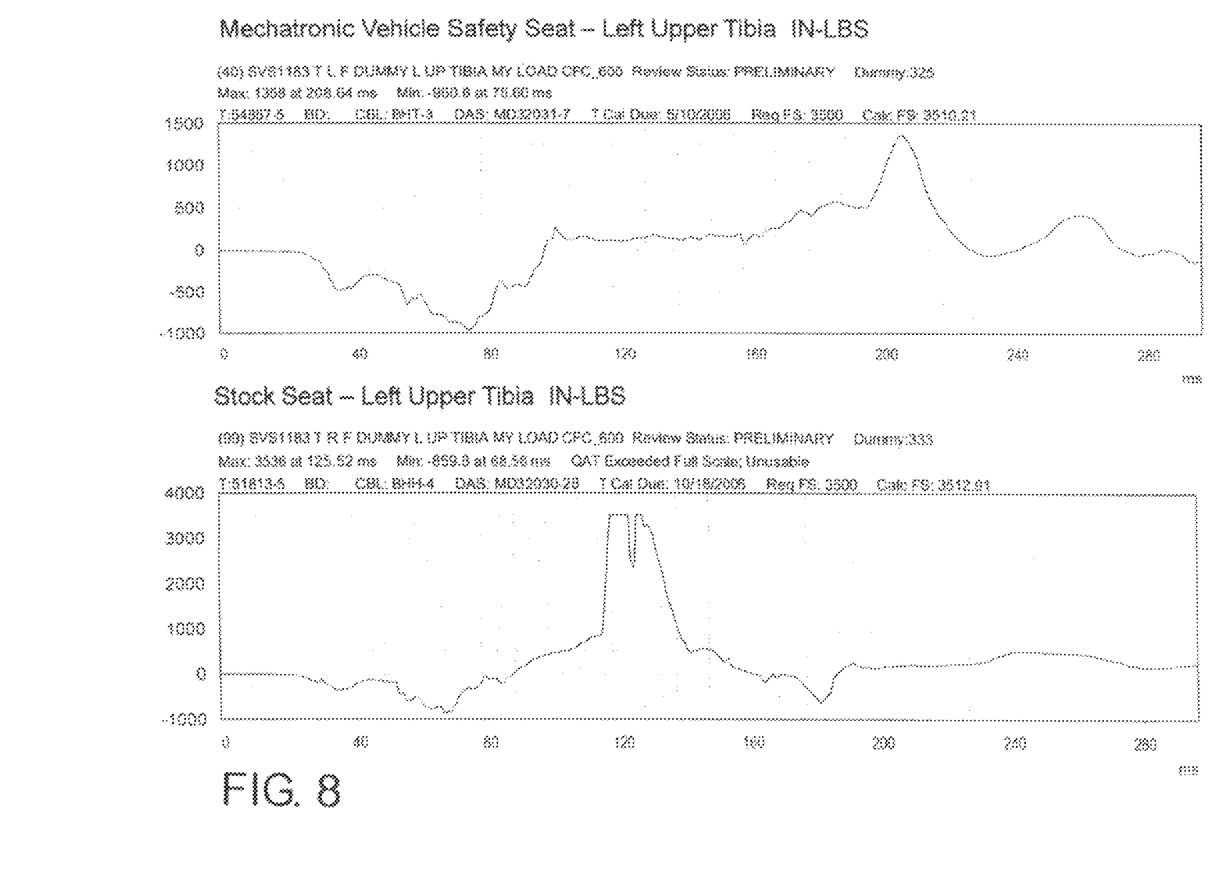
FIG. 8 shows two graphs comparing moments of force acting on the left upper tibia of a dummy occupying a vehicle safety seat versus a dummy in a stock seat from frontal sled test.

FIG. 7 and FIG. 8 illustrate comparative graphs from a frontal sled test with pitch, where the pulse corridor is 16-18 G-s and the overall velocity change is 35 mph, and two identical dummies, i.e. 50th percentile adult male ATD were recalibrated by accelerometers and load cells. The dummy occupying the safety seat experienced a safer, i.e. smaller and slower, reaction to the impact than the dummy in the stock seat. FIG. 7 charts show that maximum head acceleration of the dummy in the safety seat was 32 G-s at 160 ms and 0 G-s at 240 ms, compared to the maximum head acceleration of the dummy occupying the stock seat which was 60 G-s at 120 ms and remained at 32 G-s at 240 ms. FIG. 8 demonstrates the maximum moment of forces applied to the left upper tibia of the dummy in the safety seat which was 1358 in-lbs at 208 ms, compared to the maximum moment of forces acting on the left upper tibia of the dummy occupying the stock seat which was 3536 in-lbs at 120 ms and increased to exceed full scale. The mechatronic seat utilizes gravitational—inertial forces and the seat belt acts vertically to constrain occupants in sufficient time into a new geometric seat configuration, offering a safer position in anticipation of a collision, regardless of vehicle design specifications, seating environments, occupant's stature and initial position at the time of impact. Data demonstrated that the dummy occupying the safety seat of the present invention was subjected to considerably less accelerations, loads and moments of forces to all regions of the body than the dummy in the stock seat, especially the head and legs identified as the two most commonly injured body parts.

The forces of the second synchronized torsion springs instantly distort angles and faces of a quasi-hexahedron cuboid seat bottom frame and pairs of front and rear supporting legs to a quasi-pentahedron cuboid that offers occupants an additional protective suspension system. Altering the seat bottom frame from a first to a second position releases the third torsion springs for instantly translating the geometric configuration of the backrest frame and head restraint from the first to the second position. The vehicle safety seat utilizes most effectively the occupant's natural reflex based on the human muscular reflex system for maintaining the optimal body position to withstand collision impact forces. Test results demonstrated that the vehicle safety seat improves the safety performance of seat belts by reducing loads applied to the occupant's shoulder and torso. This active seat function also reduces the aggressiveness of air bags. Importantly, the vehicle safety seat enhances protection of occupants seated in lightweight, fuel-efficient vehicles by diminishing the effect of a collision with a heavier and stiffer vehicle.

The present invention is in no way restricted to the specific disclosure of the specification and drawings, but also encompasses any variations and modifications within the scope of the appended claims.

What is claimed is:

1. A vehicle safety seat, comprising:
    a seat bottom frame having a front and a rear, said seat bottom frame being movable when a collision is imminent substantially instantly from a substantially horizontal orientation for normal conditions to a deployed angled orientation, wherein in said deployed angled orientation said rear is substantially lower than said rear in said horizontal orientation for normal conditions, and wherein in said deployed angled orientation said rear is substantially lower than said front;
    a substantially vertical backrest frame, said backrest frame being movable when a collision is imminent substantially instantly from a normal backrest configuration to a deployed backrest configuration, said backrest frame being movable rearwards and downwards to said deployed backrest configuration, said backrest frame in said normal backrest configuration defining a backrest angle relative to a vehicle floor, and said backrest frame in said deployed backrest configuration defining a substantially equal angle; and
    a seat recliner having a substantially vertical orientation and having a front edge;
    wherein said backrest frame comprises a rigid linkage, said rigid linkage is disposed forward of said front edge of said seat recliner, said rigid linkage forming a gap between said rigid linkage and said seat recliner when said backrest frame is in said normal backrest configuration, said gap being substantially decreased when said backrest frame is in said deployed backrest configuration.

2. A vehicle safety seat as in claim 1 wherein said seat bottom frame comprises a frontal section, a middle section and a rear section;
    said middle section defining a substantially horizontal plane substantially parallel to said vehicle floor in said normal horizontal orientation of said seat bottom frame;
    said rear section slanting upwards and rearwards from said substantially horizontal plane of said middle section in said normal horizontal orientation;
    said frontal section extending substantially vertically downwards from said substantially horizontal plane of said middle section in said normal horizontal orientation;
    said frontal section extending substantially horizontally forwards from said middle section when said seat bottom frame is in said deployed angled orientation;
    wherein said frontal section of said seat bottom frame in said angled orientation is not substantially higher or lower relative to said vehicle floor than said middle section of said seat bottom frame in said substantially horizontal orientation for normal conditions.

3. A vehicle safety seat as in claim 1, further comprising:
    a seat bottom mechanism to move said seat bottom frame from said substantially horizontal orientation into said deployed angled orientation; and
    a backrest mechanism to move said backrest frame from said normal backrest configuration to said deployed backrest configuration substantially simultaneously with movement of said seat bottom frame from said substantially horizontal orientation into said deployed angled orientation.

4. A vehicle safety seat as in claim 3, further comprising:
    a pre-crash detection system operable to activate said seat bottom mechanism and said backrest mechanism.

5. A vehicle safety seat as in claim 3 wherein:
    said seat bottom mechanism comprises a front pivot at said front of said seat bottom frame, said seat bottom frame being rotatable about said front pivot.

6. A vehicle safety seat as in claim 5 wherein said seat bottom mechanism comprises:
    a substantially vertical rear support having a rear support upper end and a rear support lower end, said rear support upper end being connected to said rear of said seat bottom frame;
    wherein said rear support is movable downwards, thereby lowering said rear and causing said seat bottom frame to rotate partially about said front pivot from said substantially horizontal orientation to said deployed angled orientation.

7. A vehicle safety seat as in claim 6, further comprising:
    a seat height adjustment mechanism;
    wherein said seat bottom frame in said substantially horizontal orientation for normal conditions defines a normal seat bottom angle relative to said vehicle floor;
    said seat height adjustment mechanism is operable to adjust said normal seat bottom angle relative to said vehicle floor within a normal adjustment range to a maximum normal seat bottom angle relative to said vehicle floor;
    wherein said seat bottom frame in said deployed angled orientation defines a deployed seat bottom angle relative to said vehicle floor, said deployed seat bottom angle exceeding said maximum normal seat bottom angle; and
    wherein said seat height adjustment mechanism comprises an upper member, and the lowest part of said seat bottom frame in said deployed angled orientation is not higher than said upper member.

8. A vehicle safety seat as in claim 6 wherein said backrest mechanism comprises:
    a backrest pivot integral with said rigid linkage;
    a recliner pivot integral with said seat recliner;
    a hinge pivotally connecting said rigid linkage and said seat recliner, said hinge attached to said rigid linkage at said backrest pivot, said hinge attached to said seat recliner at said recliner pivot, said hinge facilitating movability of said rigid linkage rearwards and downwards toward said seat recliner.

9. A vehicle safety seat as in claim 6 wherein:
said front edge of said seat recliner defines a recliner angle substantially equal to said backrest angle; and
said substantially vertical seat recliner has a position and an orientation that remain substantially unchanged when said backrest frame is moved from said normal backrest configuration to said deployed backrest configuration.

10. A vehicle safety seat as in claim 1, further comprising:
means for moving said seat bottom frame from said substantially horizontal orientation into said deployed angled orientation; and
means for moving said backrest frame from said normal backrest configuration to said deployed backrest configuration substantially simultaneously with movement of said seat bottom frame from said substantially horizontal orientation into said deployed angled orientation.

11. A method of transforming the geometry of a vehicle seat to protect a seat occupant when a collision is imminent, comprising:
moving a seat bottom frame substantially instantly when a collision is imminent from a substantially horizontal orientation to a deployed angled orientation in which a rear of said seat bottom frame is lower than a front of said seat bottom frame; and
moving substantially instantly before said imminent collision a substantially vertical backrest frame from a normal backrest configuration to a deployed backrest configuration by moving said backrest frame rearwards and downwards to said deployed backrest configuration, said backrest frame in said normal backrest configuration defining a backrest angle with respect to a vehicle floor, and said backrest frame in said deployed backrest configuration defining a substantially equal angle;
wherein said moving said seat bottom frame comprises moving a rear support from a substantially vertical position to a substantially horizontal position by a pivoting of said rear support at a rear pivot located at said rear of said seat bottom frame and at a rear support upper end, thereby partially rotating said seat bottom frame about a front pivot located at said front of said seat bottom frame and at a front support upper end and thereby lowering said rear of said seat bottom frame, so that said front of said seat bottom frame in said deployed angled orientation is not substantially higher or lower relative to said vehicle floor than said front of said seat bottom frame in said substantially horizontal orientation.

12. A method as in claim 11 wherein said moving said seat bottom frame comprises:
lowering a rear support connected to said rear of said seat bottom frame, thereby lowering said rear and causing said seat bottom frame to rotate partially about said front pivot located at said front; and
wherein said lowering said rear support causes lowering said rear of said seat bottom frame to a height at least as low as an upper member of a seat height adjustment mechanism.

13. A method as in claim 11 wherein:
a seat recliner having a substantially vertical orientation and having a front edge defines a recliner angle substantially equal to said backrest angle;
said backrest frame comprises a rigid linkage, said rigid linkage is disposed forward of said front edge of said seat recliner, said rigid linkage forms a gap between said rigid linkage and said seat recliner when said backrest frame is in said normal backrest configuration; and
said moving said backrest frame from said normal backrest configuration rearwards and downwards to said deployed backrest configuration substantially decreases said gap;
said moving said seat bottom frame and said moving said vertical backrest frame are performed substantially simultaneously; and
said moving said backrest frame from said normal backrest configuration to said deployed backrest configuration does not change a position and an orientation of said seat recliner.

14. A vehicle safety seat, comprising:
a seat bottom frame having a front and a rear;
a substantially vertical front support having a front support upper end and a front support lower end, said front support upper end being pivotally connected at a front pivot to said front of said seat bottom frame; and
a substantially vertical rear support having a rear support upper end and a rear support lower end, said rear support upper end being pivotally connected to said rear at a rear pivot;
wherein said rear support is movable from a substantially vertical position to a substantially horizontal position by pivoting at said rear pivot, thereby lowering said rear and causing said seat bottom frame to rotate partially about said front pivot from a substantially horizontal orientation for normal conditions to a deployed angled orientation when a collision is imminent, said rear in said deployed angled orientation being lower than said front; and
wherein said front of said seat bottom frame in said angled orientation is not substantially higher or lower relative to said vehicle floor than said front of said seat bottom frame in said substantially horizontal orientation for normal conditions.

15. A vehicle safety seat as in claim 14, further comprising:
a substantially horizontal sliding rail disposed beneath said seat bottom frame;
a slider, said slider being slidably connected to said sliding rail; and
a slider pivot, said rear support lower end being pivotally attached to said slider at said slider pivot;
wherein said slider is located at a normal slider position during normal conditions, and said slider is operable to slide substantially horizontally to a deployed slider position when a collision is imminent, thereby moving said rear support lower end pivotally attached at said slider pivot, which causes said rear support to move from said substantially vertical position to said substantially horizontal position by pivoting at said rear pivot.

16. A vehicle safety seat as in claim 15, further comprising:
a seat height adjustment mechanism comprising a front member, an upper member, a lower member and a rear member;
wherein a portion of said upper member serves as said sliding rail; and,
said front support lower end is rigidly attached to said front member of said seat height adjustment mechanism; and
wherein when said seat bottom frame is in said deployed angled orientation, said rear pivot is not higher than said upper member of said seat height adjustment mechanism.

17. A vehicle safety seat as in claim 16, further comprising:
a latch, said latch being operable in a hold status to hold said slider at said normal slider position during normal conditions, said latch being operable in a deployed status to allow said slider to move to said deployed slider position when a collision is imminent; and a biasing means to move said slider to said deployed slider position when a collision is imminent.

18. A vehicle safety seat as in claim 14, further comprising:

a substantially vertical backrest frame, said backrest frame being movable from a normal backrest configuration rearwards and downwards to a deployed backrest configuration when a collision is imminent;

wherein said substantially vertical backrest frame in said normal backrest configuration defines a backrest angle relative to a vehicle floor, and said backrest frame in said deployed backrest configuration defines a substantially equal backrest angle.

19. A vehicle safety seat as in claim 18, further comprising:

a seat recliner having a substantially vertical orientation and having a front edge, said front edge defining a recliner angle substantially equal to said backrest angle; and a rigid linkage integral with said backrest frame, said rigid linkage being disposed forward of said front edge of said seat recliner, said rigid linkage forming a gap between said rigid linkage and said seat recliner when said backrest frame is in said normal backrest configuration, said gap being decreased when said backrest frame is in said deployed backrest configuration; and a backrest biasing means for urging said rigid linkage from a normal position rearwards and downwards to a deployed position when a collision is imminent, thereby moving said backrest frame from said normal backrest configuration to said deployed backrest configuration substantially simultaneously with movement of said seat bottom frame from said substantially horizontal orientation into said deployed angled orientation;

wherein said substantially vertical seat recliner has a position and an orientation that remain substantially unchanged when said backrest frame is moved from said normal backrest configuration to said deployed backrest configuration.

20. A method as in claim 13 wherein:

said moving said backrest frame comprises pivoting said backrest frame on a hinge that connects said rigid linkage of said backrest frame to a substantially vertical seat recliner.

\* \* \* \* \*